United States Patent
Bhatia (10) Patent No.: US 11,734,748 B2
(45) Date of Patent: Aug. 22, 2023

(54) MANUFACTURE, SYSTEM, AND METHOD FOR COLLABORATIVE AND IMPROVED PROCESSING OF COMMERCIAL TRANSACTIONS IN A VENDOR SERVICE AREA

(75) Inventor: Shashank Bhatia, New Delhi (IN)

(73) Assignee: Shashank Bhatia

( * ) Notice: Subject to any disclaimer, the term of this patent is extended or adjusted under 35 U.S.C. 154(b) by 758 days.

(21) Appl. No.: 14/366,274

(22) PCT Filed: Jun. 6, 2012

(86) PCT No.: PCT/IB2012/052862
§ 371 (c)(1),
(2), (4) Date: Jun. 20, 2014

(87) PCT Pub. No.: WO2013/098661
PCT Pub. Date: Jul. 4, 2013

(65) Prior Publication Data
US 2015/0032567 A1   Jan. 29, 2015

(30) Foreign Application Priority Data
Dec. 29, 2011   (IN) .......................... 3860/DEL/2011

(51) Int. Cl.
*G06Q 30/00*   (2023.01)
*G06Q 30/0601*   (2023.01)
(Continued)

(52) U.S. Cl.
CPC ......... *G06Q 30/0633* (2013.01); *G06Q 20/14* (2013.01); *G06Q 30/06* (2013.01); *G06Q 50/12* (2013.01)

(58) Field of Classification Search
CPC ..... G06Q 30/0601–0645; G06Q 30/08; G06Q 20/14; G06Q 20/32; G06Q 30/06; G06Q 50/12
(Continued)

(56) References Cited

U.S. PATENT DOCUMENTS

| | | | | |
|---|---|---|---|---|
| 7,953,873 B1 * | 5/2011 | Madurzak | ............... | G06Q 30/02 709/229 |
| 2002/0133418 A1 * | 9/2002 | Hammond | ............. | G06Q 30/06 705/26.8 |

(Continued)

OTHER PUBLICATIONS

Tsirulnik, Giselle, Fast-food chain Subway launches mobile ordering system, MarketingDive, accessed at [https://www.marketingdive.com/ex/mobilemarketer/cms/news/commerce/2593.html] (Year: 2009).*

*Primary Examiner* — Michael Misiaszek
*Assistant Examiner* — Lindsey B Smith (57) ABSTRACT

Embodiments are in the field of mobile applications and wireless processing, especially of commercial transactions, and more specifically for enhancing the user experience in restaurants even while enhancing the service delivery model efficiency of restaurants. Embodiments include a computer accessible medium for processing commercial transactions, to perform operations that comprise identifying wireless devices and determining their respective locations in a vendor service area, sending an interactive order menu to the identified wireless devices, receiving and displaying order data from the wireless devices, processing the received order data, and accepting a payment for a completed order.

11 Claims, 2 Drawing Sheets

(51) Int. Cl.
*G06Q 30/06* (2023.01)
*G06Q 20/14* (2012.01)
*G06Q 50/12* (2012.01)

(58) Field of Classification Search
USPC .............................................. 705/26.1–27.2
See application file for complete search history.

(56) References Cited

U.S. PATENT DOCUMENTS

| | | | | |
|---|---|---|---|---|
| 2004/0054592 | A1* | 3/2004 | Hernblad | G06Q 20/32 705/15 |
| 2005/0043996 | A1* | 2/2005 | Silver | G06Q 10/02 705/15 |
| 2009/0037286 | A1* | 2/2009 | Foster | G06Q 20/202 705/16 |
| 2010/0082481 | A1* | 4/2010 | Lin | G06Q 40/00 705/41 |
| 2010/0161432 | A1* | 6/2010 | Kumanov | G06Q 20/102 705/15 |
| 2011/0106721 | A1* | 5/2011 | Nickerson | G06Q 30/02 705/347 |
| 2011/0218880 | A1* | 9/2011 | Hammad | G06Q 20/32 705/26.41 |
| 2012/0136754 | A1* | 5/2012 | Underwood | G06Q 30/06 705/26.43 |
| 2012/0166332 | A1* | 6/2012 | Naaman | G06Q 30/04 705/40 |
| 2012/0173396 | A1* | 7/2012 | Melby | G06Q 30/04 705/34 |
| 2013/0006782 | A1* | 1/2013 | Schwarzkopf | G06Q 30/04 705/17 |
| 2013/0027227 | A1* | 1/2013 | Nordstrom | G01C 21/3438 340/990 |
| 2013/0085931 | A1* | 4/2013 | Runyan | G06Q 20/325 705/40 |
| 2013/0138518 | A1* | 5/2013 | White | G06Q 20/204 705/16 |

* cited by examiner

MANUFACTURE, SYSTEM, AND METHOD FOR COLLABORATIVE AND IMPROVED PROCESSING OF COMMERCIAL TRANSACTIONS IN A VENDOR SERVICE AREA

FIELD

Embodiments are in the field of wireless communications. More particularly, embodiments are in the field of mobile applications and wireless processing, especially of commercial transactions, and more specifically for enhancing the user experience in restaurants even while enhancing the service delivery model efficiency of restaurants.

BACKGROUND

Retail stores are often in the business of selling inventory, i.e. goods and services, to individual customers, wherein in the context of the total turnover of goods or/and services, each transaction is relatively small. The point at which these transactions, or one or more of the components or sub-transactions take place is known as the point of sale ("POS") location. In many retail environments the point of sale also serves as a point of order entry, the point of payment and/or the point of order fulfillment. For example, retail stores often integrate order entry points, i.e. POS terminals, such as integrated order input/cash registers, with a restaurant POS system ("RPOS" system), e.g. a system, typically including a network and server, which interconnects the POS terminals with displays or terminals in the production area to convey and track orders, etc. under the management of appropriate software. Orders are typically entered into the POS system from a POS terminal, such as a cash register, inside the retail store. In other implementations, order entry, order payment and order fulfillment may occur at multiple different points/locations, as will be described below.

Exemplary retail stores include all sorts of restaurants, such as quick service, fast food restaurants, where a customer may verbally communicates their order to a cashier at a POS counter inside the restaurant. The cashier responds by entering the order into the restaurant's POS system, also referred to as a restaurant POS system ("RPOS" system). The order is entered via a POS terminal, such as an integrated order input/cash register that calculates the total price and transmits the order to the kitchen staff. These POS terminals (often referred to as "point-of-sale registers" or "POS registers") often include custom hardware and/or software and, in a typical implementation, include simplified buttons or keys representing each of the various items offered for sale, i.e. a POS terminal interface. This simplified order entry interface streamlines, accelerates, as well as minimizes errors in, the order entry process. In this manner, the cashier/counter person, upon receiving an order request for a specific item from a customer, need only push the button or key corresponding to that item, thereby entering the specific item ordered in to the RPOS system and recording the corresponding price for totaling purposes. The customer then typically pays for the food and the cashier/counter person delivers the food to the customer. In the above instance, at a fast food restaurant, typically the customer needs to stand in a queue, communicate the order to the vendor (cashier/counter person) which is then transmitted to the kitchen for execution and placed in an order queue. In restaurants where customers are seated at a table and orders are taken by a waiter, the process entails entering the received order at a POS terminal, from where it is transmitted to a kitchen, and placed in a kitchen order queue.

SUMMARY

A computer accessible medium for processing commercial transactions, comprising a processing unit coupled to a memory element, and having instructions encoded thereon, wherein the instructions cause the computer accessible medium to perform operations that comprise identifying a patron wireless device in a vendor service area, sending an interactive order menu to the identified patron wireless device, receiving and displaying patron order data from the patron wireless device; determining patron wireless device location within the vendor service area, processing the received patron order data wherein the processing comprises transmitting the order data to a display at an order execution site for execution and delivery to the patron at the identified patron location, and accepting a payment via the patron wireless device.

In a computer accessible medium comprising a processing unit coupled to a memory element and having instructions encoded thereon, a method for processing commercial transactions comprising identifying a patron wireless device in a vendor service area, sending an interactive order menu to the identified patron wireless device in the vendor service area, receiving and displaying patron order data from the patron wireless device, determining patron wireless device location within the vendor service area, processing the received patron order data wherein the processing comprises sending the order data to a display at an order execution site for execution and delivery to the identified patron location, and accepting a payment via the patron wireless device.

In a system for processing commercial transactions, a wireless communication device comprising a processing unit and a memory element, and having instructions encoded thereon, wherein the instructions cause the wireless communication device to identify a user of the device to a computing medium that comprises a vendor terminal, in a vendor service area, communicate the user device location to the computing medium, relative to the vendor terminal in the vendor service area, receive and display an interactive order menu from the computing medium, place an order request via the interactive order menu, and receive an acknowledgement of the placed order, and make a payment for a completed order.

A computer accessible medium for processing commercial transactions, comprising a processing unit coupled with a memory element, and having instructions encoded thereon, which, when the instructions are executed by a computer, cause the said computer to perform operations, comprising identifying a patron wireless communication device and its location, receiving patron order data from the identified patron wireless device, the patron order data comprising a list of ordered items and a price for each of one or more of the items, displaying patron order data on a display of the computer accessible medium, and accepting patron commercial card data for payment if payment is to be made by commercial card.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are introduced in such detail as to clearly communicate the invention. However, the embodiment(s) presented herein are merely illustrative, and are not intended to limit the anticipated variations of such embodiments; on the contrary, the intention is to cover all modifications, equivalents, and alternatives falling within the spirit and scope of the appended claims. The detailed descriptions below are designed to make such embodiments obvious to those of ordinary skill in the art.

QRCode—QR code (abbreviated from Quick Response code) is a type of matrix barcode (or two-dimensional code) first designed for the automotive industry. More recently, the system has become popular outside of the industry due to its fast readability and large storage capacity. The code consists of black modules arranged in a square pattern on a white background. The information encoded can be made up of four standardized kinds ("modes") of data (numeric, alphanumeric, byte/binary, Kanji), or by supported extensions virtually any kind of data. Created by Toyota subsidiary Denso Wave in 1994 to track vehicles during the manufacturing process, the QR code is one of the most popular types of two-dimensional barcodes. It was designed to allow its contents to be decoded at high speed.

Data Matrix Code—A Data Matrix code is a two-dimensional matrix barcode consisting of black and white "cells" or modules arranged in either a square or rectangular pattern. The information to be encoded can be text or raw data. Usual data size is from a few bytes up to 1556 bytes. The length of the encoded data depends on the symbol dimension used. Error correction codes are added to increase symbol strength: even if they are damaged, they can still be read. A Data Matrix symbol can typically store up to 2,335 alphanumeric characters.

Embodiments include systems and methods for processing commercial transactions. An embodiment includes a system comprising a wired or wireless terminal that receives patron order data from a patron wireless device, displays the order data, accepts the order data and passes the accepted order data for further processing and execution, and accepts a commercial card payment and prints an itemized bill. Embodiments also wirelessly upload commercial card information and download an authorization result.

An embodiment of the system includes a computer accessible medium for processing commercial transactions comprising a vendor terminal for receiving patron order data, a wireless device for entering patron order data via a temporarily downloaded interactive vendor menu in a vendor service area, and sending the entered data to the vendor terminal, a means for determining via the wireless device, patron location within the vendor service area, at the terminal, a means for further processing of the received patron order data wherein the processing comprises executing and delivering the patron order to the patron location, and at the vendor terminal, a means for accepting a payment via the wireless device and for printing an itemized bill.

A preferred embodiment includes a computer accessible medium for processing commercial transactions, comprising a processing unit coupled to a memory element, and having instructions encoded thereon, wherein the instructions cause the computer accessible medium to perform operations that comprise identifying a patron wireless device in a vendor service area, sending an interactive order menu to the identified patron wireless device, receiving and displaying patron order data entered via the interactive order menu from the patron wireless device, determining patron wireless device location within the vendor service area, processing the received patron order data wherein the processing comprises transmitting the order data to a display at an order execution site for execution and delivery to the patron at the identified patron location, and accepting a payment via the patron wireless device. The computer accessible medium can be a server, a computer, a wireless terminal, a cloud computing network, or any other computing medium already invented or yet to be invented.

The computer accessible medium further comprises a means for wirelessly uploading commercial card information and wirelessly downloading an authorization result, and for printing an itemized bill. An itemized bill can be printed via instructions sent from a vendor display terminal to a printing device, or may be printed automatically upon authorization. The computer accessible medium can determine patron wireless device location via at least one of a bar code scanned by the wireless device, a near field communications capability, active or passive rfid at the patron location, and manual input of patron location. For example, connectivity with a user device may be invoked when, at a table, the user scans a bar code with his or her wireless device, wherein the bar code may have further information like table number, order menu, etc. encoded in it. Alternatively, the bar code scanned may invoke connectivity to the vendor server, wherein the patron wireless device communicates patron location in the vendor service area, and receives an interactive order menu from the vendor server. Thus the scanned bar code is indicative of a specific patron location relative to the vendor terminal in a vendor service area when the patron wireless device is within a vendor service area. In a preferred embodiment the bar code is a QR code, or a Data Matrix code.

Embodiments of the system and method can operate in vendor service areas, which can be a grocery store, a supermarket, a restaurant, a night club, a bar, a multiplex, a mall, a pub, etc. Thus in embodiments wherein the vendor service area is a restaurant, a night club, a bar, or a pub, the bar code scanning at the user location such as a table, a position at the bar counter in the bar, etc. can be used to indicate a table number or other location in the restaurant, night club, bar, or/and pub. Preferably the bar code is a QR code or a Data Matrix code.

An order entered through the wireless device and received by the computer accessible medium is processed for execution, wherein the processing further comprises sending the order for execution to at least one of a kitchen, a warehouse, a cold storage, and a personal helper. When the order is made in a restaurant where a user is seated at a particular table, the table contains a bar code which when scanned by the user wireless device identifies the table by its location relative to the vendor terminal, or/and table number. Preferably the bar code is a QR code or a Data Matrix code.

An embodiment includes a wireless device wherein a preferred embodiment wireless device comprises a smart phone capable of communicating with a vendor terminal via a temporarily downloaded user friendly interactive interface, which interface is used for entering a patron order, and receiving acknowledgement from the vendor terminal of the placed order. Specifically, in a restaurant (say), a smart phone is used to check in at a location like (say) a table at which the patron is seated. A means is provided in the system wherein the table can be identified to the vendor terminal. The provided means includes identifying patron location by scanning a bar code embossed on the table, wherein the bar code is scanned with the patron's smart phone. Preferably the bar code is a QR code or a Data Matrix code. A user simply needs to scan his or her smart phone over the bar code to login to the system wherein a temporarily downloaded interactive menu and ordering interface connects a user to the vendor terminal, wirelessly, further identifying the user by table number, table location, or any other identifying means, to the vendor terminal. In a preferred embodiment a repeat user is recognized by his or her phone number or phone type, and their ordering history is used to suggest their preferences and offer them special deals or discounts.

Figure 1:
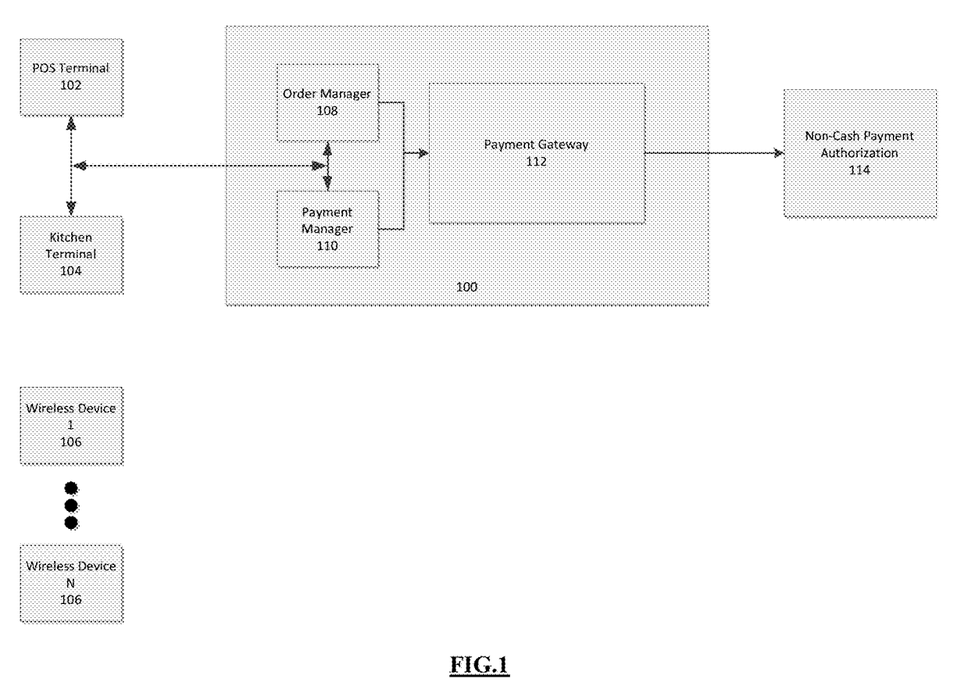
FIG. 1 depicts an embodiment of an example wireless system for processing restaurant service transactions.

FIG. 1 shows an embodiment of an example wireless system for processing restaurant service transactions. The system comprises one or more point of sale (POS) terminals 102 and one or more patron wireless devices 106 that communicate with a server 100, wherein the server 100 comprises a computer with a processing unit to execute computer code and coupled with a memory element to store computer code. In a preferred embodiment, the server 100 further comprises wireless communication means such as a transceiver, for communicating directly with wireless devices, such as smart phones over short distances, such as a vendor service area. A POS terminal 102 comprises a video monitor and a keyboard and allows a waiter or waitress (hereafter, "waiter") to receive and forward patron order data. Patron order data may comprise items on a restaurant's interactive menu, displayed on the patron wireless device, ordered by one or more patrons at a table, as well as the price of each ordered item. A POS terminal may be connected to server system 100 by wire line or may be connected to server 100 wirelessly; that is, over a radio frequency (RF) channel, Bluetooth, infrared, near field communications, or any other wireless communication means. An optional embodiment includes a Kitchen Terminal 104 wherein it receives patron order data, communicated via the POS Terminal 102, or directly from the patron wireless device 106 via the server 100. Preferably, the wireless communication means are local such that the POS terminal or server and patron wireless device talk to each other without having to go through a cellular, satellite, or internet network. However the server may communicate with a network of restaurants via a global network or the cloud.

Server 100 connects wirelessly to one or more patron wireless devices 106. Accordingly, server 100 comprises a transceiver (transmitter/receiver) to transmit information to the patron wireless device 106 and to receive information from the wireless device 106. The patron wireless device 106 comprises an alpha-numeric keypad, video display, a processor to execute computer code, a memory to store computer code, and a transceiver for wireless communication with server 100. Preferably, wireless device 106 is a smart phone and can communicate with the server via several forms of wireless communication, i.e. via Bluetooth, infrared, near field communications (NFC), local area network wireless connectivity, via cloud computing through the internet, and any other effective form of wireless communication. The communication can be activated by bar code scanning, passive or active rfid tags, etc. Preferably, bar code scanning comprises scanning a QR code or a Data Matrix code. The interactive menu on the wireless device may offer a virtual keypad which comprises function keys such as "YES", "NO", "ENTER", "CANCEL", as well as arrows to cause the display to scroll, etc. An additional key or virtual button may be labeled "CALL WAITER" which when invoked can cause a page to the waiter informing of the patron's request along with patron table number. In an alternate embodiment, the page may be communicated to the POS monitor, and the waiter's supervisor may inform the waiter of the patron request.

Patron wireless device 106 allows the patron to view his or her order data, a subtotal of an amount owed, a tip amount, an amount tendered, and other data. The patron may enter data such as a tip amount, which is received via the server at the POS terminal 102, through which an itemized bill may be printed. The patron wireless device 106 also facilitates making a payment via a debit card or credit card, and in a preferred embodiment, via near field communication. Thus, a patron need not hand over his or her credit or debit card information to the waiter or vendor to whom a payment needs to be made.

In the embodiment of FIG. 1, server 100 further comprises order management software 108 which is executed to provide order management functionality. Additionally, payment management software 110 is executed to provide payment management functionality. One or more payment gateway interfaces 112 are provided to communicate vital credit card or debit card data to a credit card authorization system or debit card authorization system 114, respectively.

The system of FIG. 1 may be implemented as a Wireless Local Area Network (WLAN) compatible with different parts of the Institute for Electrical and Electronics Engineers (IEEE) standard 802.11, including 802.11a, 802.11b, and 802.11g, as well 802.11n. The wireless network of FIG. 1 may also comply with other wireless standards. Thus, for example, a Wireless Access Point may reside between the server and the patron wireless devices, or may be incorporated within the server. In an example embodiment of (say) a restaurant order processing system and method, the communication between a patron wireless device and the server can be invoked when the wireless device scans a bar code, via tapping a near field communications terminal, via passive or active rfid, or/and any other means already invented or yet to be invented. Scanning a bar code preferably includes scanning a QR code or a Data Matrix code.

Order manager 108 comprises an interface, displayed on the video monitor of a POS terminal 102 that enables a waiter to approve and forward a patron's order data received, including table number, check number, items ordered and price per item. This information is received back by order manager 108 which may send the order to a display of a terminal in the kitchen of the restaurant where the order is prepared. In an alternate embodiment, the order manager may approve and send the order received from the patron wireless device directly to a display terminal of the kitchen for execution, in an automated fashion. Order manager 108 enables splitting of a check to create separate checks for each of a plurality of patrons at a table. The checks may be split evenly, or depending upon what each patron ordered via their wireless devices. Each split amount is sent to each corresponding patron wireless device, and each patron can independently pay the requisite amount by whatever means they deem fit, and accepted by the vendor. Order manager 108 also sends order data to payment manager 110 to be transmitted to each concerned patron wireless device 106. Order manager 108 may also receive payment data, including amount tendered, credit card information, debit card information, and gift certificate information from payment manager 110.

The payment manager 110 also facilitates communication with patron wireless devices 106. Payment manager 110 may send to each relevant patron wireless device 106 via the server's transceiver, formatted confirmation of patron order data including a list of items ordered by that patron, price per item, order subtotal, recommended tip amounts, etc. Alternatively, if multiple patrons sitting at the same table have opted to split the check evenly, then entire patron order data along with price per item, order subtotal, recommended tip amounts, etc. is sent to each patron wireless device at that table. Patron wireless devices 106 send payment data including amount tendered, tip amount, credit card information, debit card information, etc. to payment manager 110 where payment data is formatted and processed. In one embodiment, payment manager 110 routes debit card information, including card number, PIN, expiration date, and amount to be debited to a payment gateway interface 112. Payment gateway interface 112 is an interface that formats and transmits card information to a debit card authorization system 114. Debit card authorization system 114 is an external system that may be accessed by phone or internet or other means. Card authorization system 114 will authorize or reject debit card payment and transmit the authorization result back to payment gateway interface 112, which formats and transfers this information to payment manager 110.

In another embodiment, payment manager 110 routes credit card information, including card number and amount to be charged, to order manager 108. Order manager 108 routes this information to a payment gateway interface 112 which formats and transmits this information to a credit card authorization system 114. Credit card authorization system 114 is an external system that may be accessed by phone or internet or other means. Card authorization system 114 will authorize or reject credit card payment and transmit the authorization result back to payment gateway interface 112. The result is then formatted and transferred to payment manager 110 by way of gateway interface 112 and order manager 108. In yet another embodiment, payment manager 110 connects directly to payment gateway interface 112 to interchange credit card information.

Thus, in a typical transaction, a waiter need not come to a patron's table to take the patron's order, unless summoned by the "CALL WAITER" option on the interactive menu interface on the patron wireless device 106. The patron's order data is received at the POS terminal 102, from where it is approved and forwarded to the kitchen via the order manager 108. Alternatively, the order data is automatically forwarded to the kitchen by the order manager 108. Order manager 108 will send the order data to the kitchen, and will further store the data for future retrieval by payment manager 110. When the patron is finished with his meal, he or she can opt to make the payment through their wireless device 106, or alternatively can request to make the payment manually, i.e. by handing over cash, a check, or credit or debit card to the waiter or vendor. The waiter swipes an ID card through a card reader and inputs the patron's check number or table number. The input data is then transmitted to payment manager 110 which verifies the waiter's ID. Payment manager 110 also retrieves patron order data corresponding to the check number or table number, formats the data, and transmits it to the POS, and in some embodiments to the patron wireless device 106.

In a preferred embodiment, patron wireless device 106 receives the applicable patron order data retrieved by payment manager 110 and an itemized check is displayed on the patron wireless device 106. The display may comprise an itemized and priced list of food and drink items ordered and served to the patron as well as a subtotal. Optionally, the patron can request via the wireless device that a hard copy print out of the bill be delivered to him or her. Additionally, the patron wireless device may also receive from the payment manager 110, a recommended tip, a select field to enable the patron to select a recommended tip amount, and a tip entry field to enable the patron to enter a tip amount. Upon entry or selection of a tip amount, or upon choosing not to tip, the patron wireless device may further display a total. The interface on the patron wireless device may also provide an entry field for an amount tendered in cash, check or gift certificate to be applied toward payment of the bill and a total amount due, after subtracting an amount tendered by the patron.

Once a total amount due is computed, after entry of a tip amount and applying credit for any cash, check or gift certificates, the patron may either save the itemized check on the wireless device or/and may request a print out of the itemized check that includes: an itemized and priced list of food items ordered and served, a tip amount, any credits applied and a total amount due. Thus, the patron is given the option to select a form of payment such as by cash or check, gift certificate, credit card or debit card. The patron makes this selection.

If payment is by credit card, then the credit card number and amount due is wirelessly transferred to payment manager 110. Payment manager 110 then seeks credit card authorization by way of a payment gateway interface that connects to a merchant's credit card authorization process 114. If payment is by debit card, then the card number, the patron's PIN, and the amount due, is wirelessly transferred to payment manager 110. Payment manager 110 then seeks debit card authorization by way of a payment gateway interface that connects to a merchant's debit card authorization process 114. Once payment by credit card or debit card is authorized, a message is sent to be displayed on wireless device 106 to indicate to the patron that the transaction has been approved.

Embodiments disclosed include a system and method for processing commercial transactions. The method comprises identifying a patron wireless device location in a vendor service area, wirelessly downloading an interactive menu on the patron wireless device, wirelessly uploading patron order data, the patron order data comprising a list of ordered items and a price for each item. The uploaded patron order data is sent via a server to a POS terminal, and also displayed on the patron wireless device. A payment may be made via credit or debit card, Google wallet, near field communications, etc. through the patron wireless device so that the patron need not surrender their card to the vendor for a payment to be made. Alternatively, a card reader through which a commercial card is swiped, accepts, patron commercial card data as payment for items ordered. Embodiments may further comprise means for accepting a tip amount and an amount tendered in cash or by check or by gift certificate. The method may further comprise wirelessly uploading from the patron wireless device the patron payment data and wirelessly downloading a commercial card authorization result to the patron's wireless device.

Embodiments disclosed comprise a wireless commercial transaction system. The system comprises an order management process that facilitates receiving patron order data from a patron wireless device in a vendor service area. Patron order data comprises items ordered by a patron, and is further transmitted to a payment management process. The system further comprises a payment management process to wirelessly transmit patron order data received from the order management process to a terminal, preferably wirelessly, and to wirelessly receive payment information from the terminal. The payment information may comprise an amount tendered in cash and/or gift certificates, or commercial card information. The system may further comprise an interface process between the payment management process and a commercial card authorization process to transmit commercial card information and to receive an authorization result. The payment management process may wirelessly download to the terminal the authorization result, which is then communicated to the patron wireless device.

An embodiment includes, in a system for processing commercial transactions, a wireless communication device comprising a processing unit and a memory element, and having instructions encoded thereon, wherein the instructions cause the wireless communication device to identify a user of the device to a computing medium that comprises a vendor terminal, in a vendor service area, communicate the user device location relative to the vendor terminal in the vendor service area, to the computing medium, receive and display an interactive order menu from the computing medium, place an order request via the interactive order menu, and receive an acknowledgement of the placed order, and make a payment for a completed order. The wireless device identifies itself to the computing medium via at least one of Wi-Fi connectivity, passive or active RFID, bar code scanning, Bluetooth connectivity, Infrared connectivity, near field communications, and global or local positioning capability. In an embodiment, communicating the wireless device location relative to the vendor terminal comprises a bar code scanning means, such that a scanned bar code invokes communication with the vendor terminal and contains information about the exact location of the wireless communication device relative to the vendor terminal. Preferably, the bar code scanned is a QR code or Data Matrix code and contains location information, and an order menu—further, preferably scanning the bar code invokes connectivity with/to the computing medium associated with the vender terminal. Preferably in (say) a restaurant, the exact location of the wireless communication device is a table number contained in the scanned bar code. The wireless communication interactive order menu interface, preferably further comprises a paging function that when invoked pages a waiter for help wherein information of a table number from where help is requested is also sent to the waiter. An exemplary embodiment wireless communication device comprises instructions encoded that further cause the device to translate the interactive order menu in the user's language of preference, and communicate a placed order in the vendor's language.

An embodiment includes, in a computer accessible medium comprising a processing unit coupled to a memory element and having instructions encoded thereon, a method for processing commercial transactions comprising identifying a patron wireless device in a vendor service area, sending an interactive order menu to the identified patron wireless device, receiving and displaying patron order data from the patron wireless device, determining patron wireless device location within the vendor service area, processing the received patron order data wherein the processing comprises displaying the order at an order execution site for execution and delivery to the identified patron location, and accepting a payment via the patron wireless device. The method further comprises uploading commercial card information by the wireless device, and downloading an authorization result, and further printing an itemized bill. Additionally, wherein identifying the wireless device comprises identifying the device by at least one of global or local positioning system, a Wi-Fi network, passive or active RFID recognition, Bluetooth connectivity, Infrared connectivity, and a bar code scanned by the wireless device. Preferably, the scanned barcode further indicates via the wireless device, exact patron wireless device location relative to the vendor terminal in the vendor service area. In a preferred embodiment, scanning the bar code invokes connectivity of the wireless device with the computer accessible medium in the vendor area, and also invokes an interactive order menu through which a user communicates with the vendor terminal via the computer accessible medium. Preferably the scanned bar code is a QR code or a Data Matrix code. The vendor service area can be a grocery store, a supermarket, a restaurant, a night club, a bar, a multiplex, a mall, a pub, etc. The bar code scanning described above can be used to indicate a table number in a restaurant, a night club, a bar, and/or a pub. Other variations are possible as would be apparent to a person having ordinary skill in the art. For example, at a grocery store, the bar code scanning may be used to register items purchased, and subsequently to make a payment. Additionally, a combination of bar code scanning and near field communications may be used to scan items, and subsequently make a payment with near field communication capability on the user wireless device. Yet additionally, wireless devices can be equipped with payment making facilities like Google Wallet, and payments can be made via near field communications, Bluetooth, infrared, bar code scanning, and any other means already invented or yet to be invented. Variations and modifications of the above are possible, as would be apparent to a person having ordinary skill in the art. In a method employed at a restaurant, a preferred embodiment includes sending patron order data directly to a kitchen for execution, where the order is placed in a queue. Other embodiments include receiving the patron order data at a vendor terminal, from where the operator of the vendor terminal forwards the order to the kitchen with or without modification or correction. The order can be sent for execution from a vendor terminal to a kitchen, a warehouse, a cold storage, and a personal helper, depending on the vendor service area where the method is being implemented.

Figure 2:
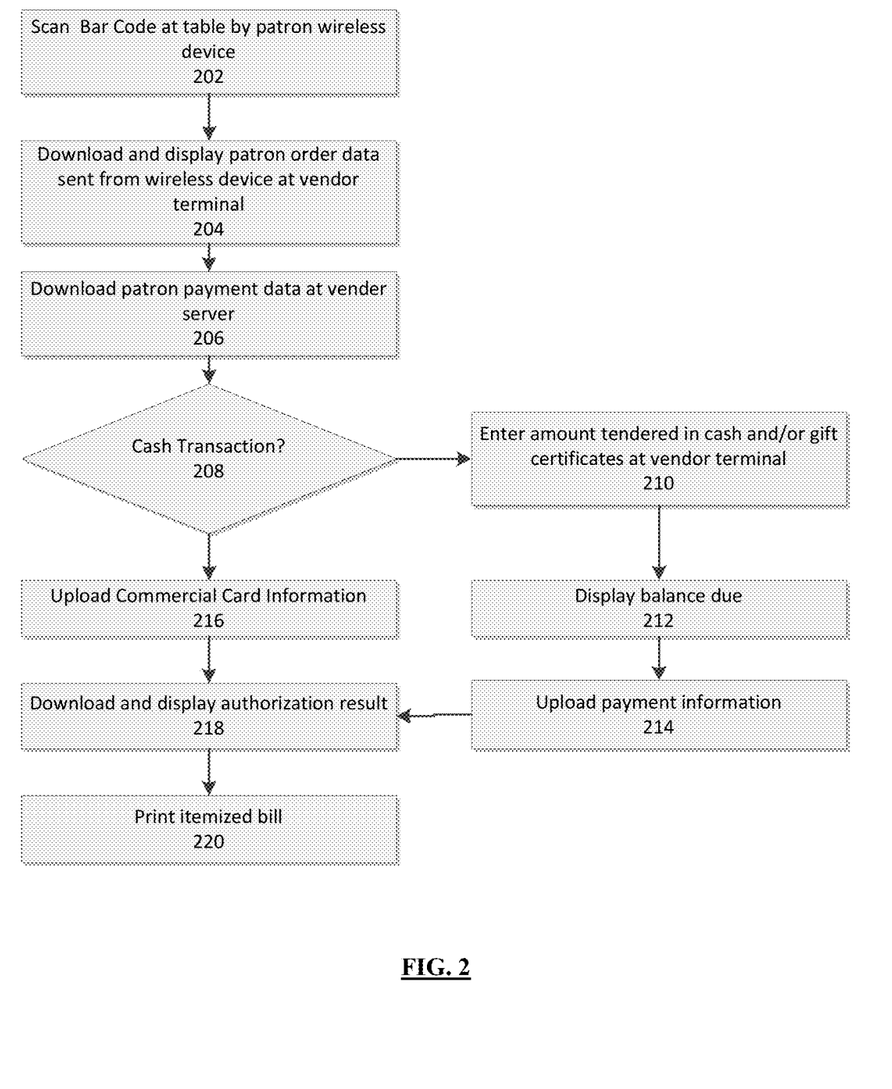
FIG. 2 depicts an embodiment of an example flowchart for wirelessly processing commercial transactions.

FIG. 2 shows an embodiment of an example flowchart 200 depicting the process flow of the method for processing commercial transactions in a restaurant. When a patron is seated at a table or bar, he or she swipes his or her wireless device over a bar code on the table or bar counter next to which the patron is seated (element 202). Preferably the bar code is a QR code or a Data matrix code. Scanning the bar code connects the user to an ordering system comprised in the computer accessible medium, and identifies to the computer accessible medium, the user location (viz. table number, bar counter number, etc.) at the restaurant. Essentially, in the example embodiment, scanning the bar code invokes communication with the computer accessible medium via an interactive ordering menu which pops up and connects with the computer accessible medium vendor terminal, and in some embodiments, connects the user directly with the kitchen. Preferably, an interactive interface pops up on the user held wireless device, and the interactive interface comprises a menu, an ordering means, and a payment processing means. In an embodiment, menu choices are presented in the form of buttons which choices are presented in the form of text as well as little pictures illustrating the choice for better understanding. In a preferred embodiment, a customization capability for menu selections is available (additions to dishes substitutes for side orders, special instructions, etc.). An exemplary embodiment includes allowing multiple users at a table to scan the same bar code and yet order independently of the other users. Alternatively the table at which multiple patrons are seated may have as many bar codes associated with that table as there are seats (chairs) that that particular table can accommodate—Alternatives wherein the billing can be split according to the preference of the users is also provided. The system includes identifying multiple users and allowing the multiple users to access the ordering services and also synchronizing the order page for the wireless devices wherein each user can see what each other user identified at the same table via the same bar code, has ordered. This synchronization can be done in an automated fashion, or can be done by obtaining user permission. An exemplary embodiment provides additional functionality wherein one user is logged in as a host, while the others log in as guests, and the host can make special requests and delete unwanted items on the menu list—thus the deleted items will not appear on the menu interface of the guest users.

In the next step (element 204) the computer accessible medium wirelessly downloads patron order data received from patron wireless devices, and transmits the downloaded data to the vender terminal display. An operator at a vendor terminal display verifies the order before sending the order to a kitchen terminal display. In alternate embodiments the downloaded patron order data is transmitted directly to the kitchen terminal display and placed in an order queue. In the next step, the computer accessible medium wirelessly downloads the patron order payment data (element 206). The patron order payment data is displayed on the vendor terminal. An amount of a tip may also be entered by the patron or a tip amount may be selected by the patron. A menu displayed on the patron wireless device allows the patron to select a form of payment. A menu displayed at the vendor terminal allows the vendor terminal operator to accept the form of payment selected by the patron. Subsequently, the vendor terminal accepts a patron payment and indicates whether the payment is by commercial card such as a credit card or debit card (element 208). If payment is by cash, check, and/or gift certificate, the waiter enters the amount at the vendor terminal or the patron enters the amount tendered on his or her wireless device (element 210). The vendor terminal then displays the balance due to the patron (element 212). The payment information is then uploaded wirelessly to the server (element 214).

If the patron chooses to pay by commercial card, the patron's card details are uploaded to the server (element 216). The commercial card information, which in the case of a debit card includes a patron-entered PIN, is uploaded wirelessly to the server (element 216). The result of authorization of the commercial card is downloaded wirelessly to the patron wireless device, the vendor terminal, or both, and the authorization result is displayed (element 218). In exemplary embodiments the payment by card can be made directly from the patron wireless device and there is no need for the patron to hand over their card information to the vendor. Preferably an option to make a payment by near field communications or/and Google Wallet and its equivalent wherein the patron simply taps their wireless device to a near field communications' payment terminal, and the payment is made. The vendor terminal optionally prints out an itemized bill (element 220) or/and sends a soft copy wirelessly to the patron wireless device. In the case of payment by commercial card, a first copy may be printed to be kept by the patron, and a second copy may be printed with a signature line to be signed by the patron and given to the waiter. Thus, the printed check may include a header and footer including date and time, an itemized list of ordered items with a price for each one, a tip amount, an amount tendered in cash, check or gift certificate, a signature line, etc. Note that in an embodiment, if there is no payment activity at the vendor terminal for a specified period of time, the transaction may automatically be cancelled. Exemplary embodiments provide the patron the option of making a payment by one user or splitting the bill in a user preferred format, i.e. splitting the bill evenly by multiple patrons at a table, or splitting the bill as per each patrons order, or any other preference requested by the patrons. Variations and modifications to the above are easily accomplished, as would be apparent to a person having ordinary skill in the art.

Some embodiments of the invention are implemented as a program product for use with an embedded processor. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Thus, another embodiment of the invention provides a machine-accessible medium containing instructions effective, when executing by a machine, to cause the machine to perform a series of operations for processing a commercial transaction. The operations comprise downloading a patron interactive menu interface on a patron wireless device in a vendor service area, receiving wirelessly by a server, patron order data, the patron order data comprising a list of ordered items and a price for each item wherein the ordered items are ordered via the interactive menu interface on the patron wireless device. The operations also comprise accepting patron commercial card data for payment. The operations may further comprise displaying a recommended tip amount and accepting a patron's tip amount from the patron wireless device. The operations may also comprise sending data to a printer to print an itemized bill. The operations may further comprise transmitting wirelessly through a transceiver, payment information, and receiving through the transceiver a commercial card authorization result.

Embodiments disclosed overcome inefficiencies and inconveniences borne by customers in existing systems and methods. Embodiments enable eliminating the need for a customer to stand in queue at fast food restaurants. Additionally, any errors in communication, and thus order taking, can be eliminated altogether, as the customer sends the order directly to the POS terminal or kitchen via an electronic device. Embodiments disclosed enable highly efficient functioning of all sorts of retail outlets, especially restaurants, further enabling restaurants to create dynamic menus that can change periodically—No expensive printing of hard copy menus is required. Embodiments enable eliminating items from the virtual menu when they are out of stock, or sold out. Embodiments enable customers who do not speak the local language to view the order menu displayed on their device in the language of their choice, and to thus order effortlessly, while the vendor receives the order in the vendor's preferred language. Embodiments provide an improved customer experience, and an improved, efficient restaurant service delivery model. Embodiments minimize, and in some instances eliminate the need for restaurants or other retail outlets to invest in front end customer interface hardware—i.e. the invention can be implemented with customer owned devices and the service provider need not hand over expensive iPads, iPods, tablet PC's, or other wireless devices to customers, thus saving precious resources, and enabling collaboratively an enriched customer experience along with an efficient service delivery model.

The present invention and some of its advantages have been described in detail for some embodiments. It should be understood that although the process is described with reference to a restaurant service transaction, the process may be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A non-transitory computer readable medium storing computer-executable instructions for processing commercial transactions that, when executed by at least one processor, configure the at least one processor to perform operations comprising:
   pre-defining a vendor service area;
   identifying and determining a location of a plurality of user devices in the pre-defined vendor service area;
   connecting the plurality of identified user devices to a vendor device via a network associated with the vendor device in the pre-defined vendor service area;
   generating an interactive order menu unique to each user device of the plurality of identified user devices wherein the interactive order menu unique to each user device is based on the user device and the determined location of the user device in the pre-defined vendor service area and includes special deals and discounts based on ordering history of the user device;
   displaying, by each of the identified user devices within the pre-defined vendor service area, the generated interactive order menu unique to each of the identified user devices, wherein each of the displayed interactive order menus comprise a plurality of items offered for sale within the pre-defined vendor service area and the special deals and discounts based on the ordering history of the user device;
   receiving by the vendor device an order summary, wherein the order summary comprises an aggregation of items selected from the plurality of items offered for sale within the pre-defined vendor service area by a group of at least two participating user devices of the plurality of identified user devices;
   receiving by the vendor device, a payment request associated with the order summary, wherein the receiving the payment request creates an itemized bill for the participating user devices in the group of participating user devices;
   sending and displaying the itemized bill to the participating user devices in the group of participating user devices associated with the corresponding order summary, wherein the itemized bill comprises a request for payment for at least one of i) an equal payment amount from each of the participating user devices in the group of participating user devices based on the order summary; and ii) a payment amount from each of the participating user devices in the group of participating user devices based on the items selected by each of the participating user devices in the group of participating user devices according to the order summary; and
   accepting a payment against the itemized bill from each of the participating user devices in the group of participating user devices based on the request for payment.

2. The non-transitory computer readable media of claim 1, wherein the computer-executable instructions further cause the at least one processor to:
   facilitate uploading commercial card information and downloading an authorization result by each of the participating user devices in the group of participating user devices, email the itemized bill to at least one of the participating user devices in the group of participating user devices, and print the itemized bill.

3. The non-transitory computer readable media of claim 1, wherein the computer-executable instructions further cause the at least one processor to perform the identifying and the determining the location of the plurality of user devices via at least one of a bar code scanned by each of the plurality of user devices, a near field communications capability comprised in each of the plurality of user devices, active or passive RFID recognition at each of the plurality of user devices location, a global positioning system, a local positioning system, and manual input on each of the plurality of user devices.

4. The non-transitory computer readable media of claim 1, wherein the computer-executable instructions further cause the at least one processor to send the interactive order menu unique to each of the identified user devices in a language of preference configurable by each of the identified user devices, and receive an order in a language of preference configurable by the vendor device.

5. The non-transitory computer readable media of claim 1, wherein the computer-executable instructions further cause the at least one processor to further generate the interactive order menu unique to each of the identified user devices based on user associated with each of the identified user devices.

6. A method for processing commercial transactions comprising:
pre-defining a vendor service area;
identifying and determining a location of a plurality of user devices in the pre-defined vendor service area;
connecting the plurality of identified user devices to a vendor device via a network associated with the vendor device in the pre-defined vendor service area;
generating an interactive order menu unique to each user device of the plurality of identified user devices wherein the interactive order menu unique to each user device is based on the user device and the determined location of the user device in the pre-defined vendor service area and includes special deals and discounts based on ordering history of the user device;
displaying, by each of the identified user devices within the pre-defined vendor service area, the generated interactive order menu unique to each of the identified user devices, wherein each of the displayed interactive order menus comprise a plurality of items offered for sale within the pre-defined vendor service area and the special deals and discounts based on the ordering history of the user device;
receiving by the vendor device, an order summary wherein the order summary comprises an aggregation of items selected from the plurality of items offered for sale within the pre-defined vendor service area by a group of at least two participating user devices of the plurality of identified user devices;
receiving by the vendor device, a payment request associated with the order summary, wherein the receiving the payment request creates an itemized bill for the participating user devices in the group of participating user devices;
sending and displaying the itemized bill to the participating user devices in the group of participating user devices associated with the corresponding order summary, wherein the itemized bill comprises a request for payment according to the payment request received from at least one of the participating user devices associated with the corresponding order summary, wherein the request for payment comprises at least one of i) a request to split the itemized bill equally between each of the participating user devices in the group of participating user devices by requesting an equal payment amount from each of the participating user devices in the group of participating user devices based on the order summary, or ii) a request to split the itemized bill unequally between each of the participating user devices by requesting a payment amount from each of the participating user devices in the group of participating user devices based on the items selected by each of the participating user devices in the group of participating user devices; and
accepting a payment against the itemized bill from each of the participating user devices in the group of participating user devices based on the request for payment.

7. The method for processing commercial transactions of claim 6 further comprising:
each of the participating user devices in the group of participating devices uploading commercial card information and downloading an authorization result; and
printing the itemized bill.

8. The method for processing commercial transactions of claim 6 wherein the identifying and the determining the location of the plurality of user devices further comprises identifying the plurality of user devices by at least one of global or local positioning system, a Wi-Fi network, RFID recognition, Bluetooth connectivity, Infrared connectivity, and a bar code scanned by each of the identified of user devices.

9. The method for processing commercial transactions of claim 6 further comprising sending the generated interactive order menu unique to each of the identified user devices in a language of preference configurable by each of the identified user devices, and receiving an order in a language of preference configurable by the vendor device.

10. The method for processing commercial transactions of claim 6 wherein the generating the interactive order menu unique to each of the identified user devices is further based on a user associated with each of the identified user devices.

11. A first wireless communication device comprising a processing unit coupled to a memory element having encoded instructions thereon, which instructions when executed by the processing unit cause the first wireless communication device to:
determine a location of the first wireless communication device in a pre-defined vendor service area;
connect to and transmit the determined location to a vendor device in the pre-defined vendor service area;
receive and display an interactive menu specific to the first wireless communication device wherein the interactive menu was generated based on the first wireless communication device and the determined location of the first wireless communication device and wherein the interactive menu comprises a plurality of items offered for sale at the determined location within the pre-defined vendor service area and special deals and discounts based on ordering history of the first wireless communication device;
based on the received interactive menu, send an order summary comprising at least one item selected from the plurality of items offered for sale at the determined location to the vendor device;
send a payment request associated with the order summary to the vendor device, wherein upon receipt of the payment request, the vendor device creates an itemized bill comprising the at least one item selected from the plurality of items and at least one second item selected from the plurality of items by a second wireless communication device;
receive and display the itemized bill according to the payment request associated with the order summary, wherein the itemized bill comprises a request for payment for at least one of i) a request to split the itemized bill equally with a plurality of wireless communication devices in the same determined location by requesting an equal payment amount from the plurality of wireless communication devices including the first wireless communication device and the second wireless communication device, or ii) a request to split the itemized bill unequally between a plurality of wireless communication devices in the same determined location including the first wireless communication device and the second wireless communication device by requesting a payment amount from the plurality of wireless communication devices based on items selected by each of the plurality of wireless communication devices; and authorize and transmit a payment against the itemized bill based on the request for payment.

\* \* \* \* \*